United States Patent

[11] 3,577,070

[72] Inventor Howard C. Whitekettle, Jr.
Towson, Md.
[21] Appl. No. 814,341
[22] Filed Apr. 8, 1969
[45] Patented May 4, 1971
[73] Assignee Western Electric Company Incorporated
New York, N.Y.

[54] METHODS OF AND SYSTEMS FOR PERFORMING TESTING OF CONDUCTORS FOR DEFECTIVE INSULATION AND CONTINUITY
10 Claims, 1 Drawing Fig.

[52] U.S. Cl.................................................. 324/51,
324/32, 324/73R
[51] Int. Cl................................................. G01r 31/02
[50] Field of Search........................................... 324/51, 52,
66, 73, 72, 133, 32, 54

[56] References Cited
UNITED STATES PATENTS
1,977,703  10/1934  Swartwout....................  324/73

| | | | |
|---|---|---|---|
| 1,977,707 | 10/1934 | Weitzer.......................... | 324/73X |
| 2,249,166 | 7/1941 | Parker et al. ................. | 324/52 |
| 2,338,245 | 1/1944 | Hays et al. ................... | 324/52 |
| 2,983,869 | 5/1961 | Schmidt ........................ | 324/73 |
| 3,029,383 | 4/1962 | Douglas et al. ............... | 324/133X |
| 3,054,949 | 9/1962 | Bates et al. .................. | 324/66 |
| 3,217,244 | 11/1965 | Glover........................... | 324/54X |
| 3,289,076 | 11/1966 | Edis et al. ..................... | 324/52X |
| 3,290,586 | 12/1966 | Anderson...................... | 324/52 |

*Primary Examiner*—Gerard R. Strecker
*Attorneys*—H. J. Winegar, R. P. Miller and Don P. Bush

ABSTRACT: Methods of and systems for applying a voltage difference between at least two adjacent insulated conductors, testing for electrical characteristics of the insulated conductors as a result of the application of the voltage difference therebetween which are indicative of defective insulation and detecting for an electrostatic field adjacent to an end of a particular one of the conductors to determine if the one conductor is continuous.

PATENTED MAY 4 1971
3,577,070
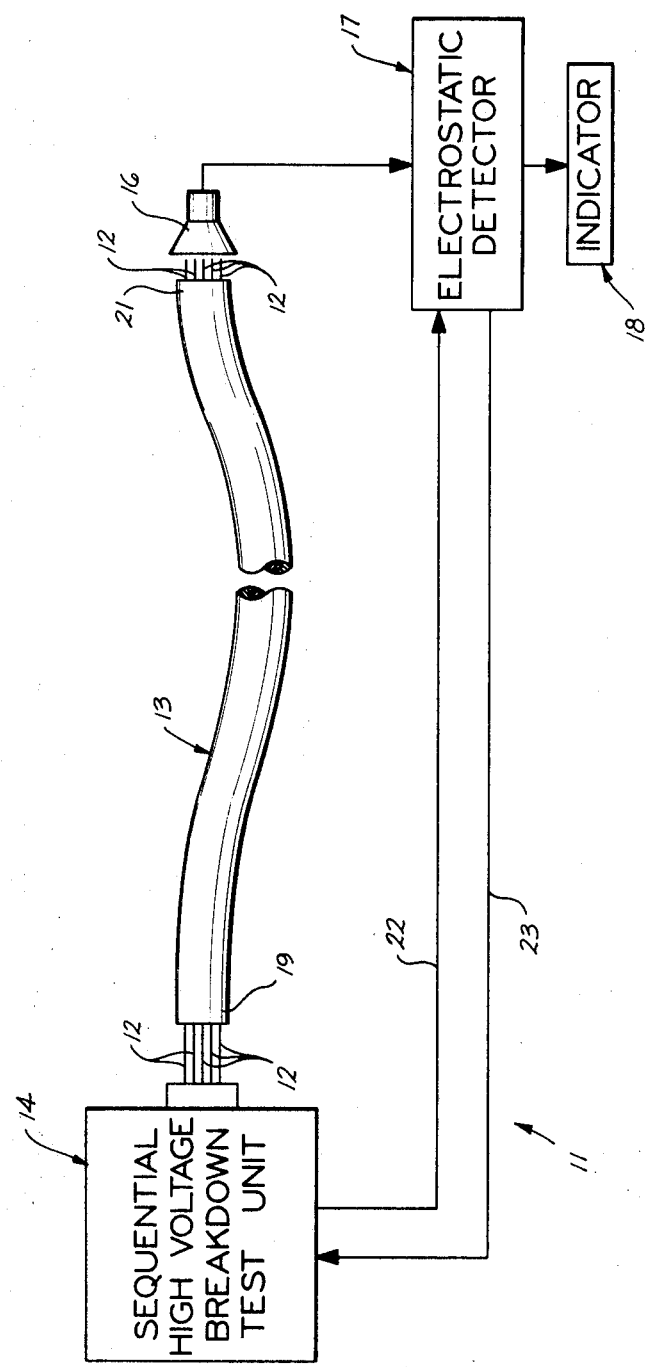
INVENTOR
H.C WHITEKETTLE, JR.
BY
ATTORNEY

METHODS OF AND SYSTEMS FOR PERFORMING TESTING OF CONDUCTORS FOR DEFECTIVE INSULATION AND CONTINUITY

BACKGROUND OF THE INVENTION

1. Field of the Invention

This invention relates to methods of and systems for performing high-speed automatic testing of electrical characteristics of conductors of a cable and more particularly to methods of and systems for automatic and simultaneous high-voltage breakdown and continuity testing of conductors of cable.

2. Description of the Prior Art

In conventional breakdown and continuity testing of conductors of a cable, the high-potential side of a high-voltage source is connected sequentially to successive conductors at a first end of the cable while the remaining conductors at the first end of the cable are connected to the low-potential side, such as ground, of the source. The ends of the conductors at the other end of the cable are open and unattached. If any insulation defects exist between the conductor connected to the high-potential side of the high-voltage source and any of the remaining conductors which are connected to the low-potential side of the source, breakdowns occur at the points of the insulation defects and current flow results through the conductors associated with the breakdowns. The current flow is detected and an indication is provided of the breakdowns.

Any shorts which exist between any of the conductors connected to the high-potential side of the high-voltage source and any of the other conductors also cause a detectable current flow to provide an indication of the shorts.

After the high-potential side of the high-voltage source is connected sequentially to each of the ends of the conductors at the first end of the cable, a continuity test is performed by an operator who connects the ends of all of the conductors at one end of the cable to the low-potential side, such as ground, of a low-voltage source and selectively and sequentially connects the high-potential side of the low-voltage source to the ends of the conductors at the opposite end of the cable. As each individual conductor is tested, an indicator, which is included in a circuit with the low-voltage source, is operated to indicate the continuity of the conductor.

Other systems have been provided for testing the continuity of conductors of a cable after a high-voltage breakdown test has been conducted. Some of these systems employ a bridge network which connects the individual conductors into one leg of the network so that when an imbalance of the bridge occurs discontinuity of the conductor was indicated.

Each of these systems require that the high-voltage tests be conducted independently of the continuity test and, therefore, are time consuming and require separate facilities.

SUMMARY OF THE INVENTION

It is therefore, an object of this invention to provide new and improved methods of and systems for performing high-speed automatic testing of a plurality of conductors.

Another object of this invention is to provide new and improved methods of and systems for conducting simultaneous high-voltage breakdown and continuity tests of conductors of a cable.

A further object of this invention is to provide new and improved methods of and systems for applying a high voltage between two conductors of a cable to determine if the insulation between one of the conductors and the adjacent conductor is defective insulation and to simultaneously develop an electrostatic field at the opposite end of a particular one of the conductors if the particular conductor is continuous whereby the electrostatic field may be detected to indicate the continuity of the particular conductor.

A method of performing high-speed testing of conductors in a cable in accordance with certain principles of the invention may include the steps of applying a voltage difference of at least a predetermined magnitude between at least two conductors, testing for electrical characteristics resulting from the application of the voltage difference to the conductors which are indicative of defective insulation and detecting for the presence of an electrostatic field adjacent to an end of at least one of the conductors to determine if a particular one of the conductors is continuous.

A system for performing high-speed testing of conductors in a cable in accordance with certain principles of the invention may include means for applying a voltage difference of at least a predetermined magnitude between at least two conductors, means for testing for electrical characteristics resulting from the application of the voltage difference to the conductors which are indicative of defective insulation and means for determining for the presence of an electrostatic field adjacent to an end of at least one of the conductors to determine if a particular one of the conductors is continuous.

BRIEF DESCRIPTION OF THE DRAWING

Other objects and advantages of the present invention will be more readily understood from the following detailed description thereof when read in conjunction with the accompanying drawing in which the FIGURE is a schematic representation of a system embodying certain principles of the invention.

DETAILED DESCRIPTION

Referring now to the drawing, there is illustrated a block diagram of a system, designated generally by the reference numeral 11, for sequentially testing each of a plurality of insulated conductors 12–12 of a cable, designated generally by the reference numeral 13, for defective insulation, shorts and continuity. The system 11 includes a sequential high-voltage breakdown test unit, designated generally by the reference numeral 14, of the type disclosed in U.S. Pat. No. 2,983,869, which issued to A. E. Schmidt on May 9, 1961. The system 11 also includes an electrostatic pickup device 16 of a type referred to as Model 2501 Detecting Head which is made commercially available by Keithley Instruments, Incorporated, of Cleveland, Ohio. The system 11 further includes a conventional electrostatic detector, designated generally by the reference numeral 17, and indicator, designated generally by the reference numeral 18. The electrostatic detector 17 is of a type referred to as Model 610B Electrometer which is made commercially available by Keithley Instruments, Incorporated of Cleveland, Ohio.

The ends of the plurality of conductors 12–12 at one end 19 of the cable 13 are connected to the high-voltage breakdown test unit 14. The opposite ends of the plurality of conductors 12–12 at an opposite end 21 of the cable 13 remain open. During a high-voltage breakdown test procedure, the high-potential side of a high-voltage source (not shown) in the test unit 14 is connected sequentially to the ends of each of the conductors 12–12 at the end 19 of the cable 13 and the ends of the remaining conductors at the same end of the cable are connected to the low-potential side, which could be ground, of the high-voltage source. If the insulation between the conductor 12 which is connected to the high-potential side of the high-voltage source and any of the adjacent conductors connected to the low-potential side of the high-voltage source is sufficiently defective, a breakdown of the defective insulation occurs and a current flow results in the affected conductors. A test is conducted by the high-voltage breakdown test unit 14 to determine if any current is flowing during this period as an indication of a breakdown of the defective insulation.

Additionally, if any shorts exist between the one conductor 12 connected to the high-potential side of the high-voltage source and any of the other conductors, a current flow results and is detectable in the same manner as the detection of breakdown of defective insulation.

It has been observed that, when the high-potential side of the high-voltage source is connected to one end of one of the conductors 12–12 at the end 19 of the cable 13, an electrostatic field is developed at the opposite, open end of the conductor. The end 21 of the cable 13 is positioned so that the open ends of the conductors 12–12 are located adjacent to the electrostatic pickup device 16. The electrostatic pickup device 16 could be positioned selectively adjacent to the open end of each of the conductors 12–12 which are connected successively at the opposite ends thereof to the high-potential side of the high-voltage source. In this manner, the electrostatic pickup device 16 would be positioned adjacent to only one of the conductors 12–12 during the testing of each conductor.

During the period when the test is being conducted to determine whether breakdowns or shorts exist, another test is conducted simultaneously to determine whether an electrostatic field is present at the end 21 of the cable 13. If the conductor 12 which is connected to the high-potential side of the high-voltage source is open, an electrostatic field will not be developed at the end 21 of the cable 13. If the detector 17 does not detect an electrostatic field during the test period, the indicator 18, which may be a lamp, is operated to indicate discontinuity of the particular conductor 12 which is connected selectively to the high-potential side of the high-voltage source.

The high-voltage breakdown test unit 14, is connected to the electrostatic detector 17 by a connecting line 22. When a relay (not shown) is operated within the high-voltage breakdown test unit 14 to facilitate the connecting of the high-potential side of the high-voltage source to one end of the selected conductor 12, the relay also controls the operation of the electrostatic detector 17 by closing an associated contact through the control line 22. Therefore, the electrostatic detector 17 will be in operation only when the high-potential side of the high-voltage source is connected to one of the conductors 12–12.

The electrostatic detector 17 is further connected to the high-voltage breakdown test unit 14 through a connecting line 23. If the selected conductor 12 is continuous and an electrostatic field is developed at the end 21 of the cable 13, the pickup device 16 senses the electrostatic field and the electrostatic detector 17 develops a signal which is coupled to the high-voltage breakdown test unit 14 through the connecting line 23. The developed signal facilitates the control of a sequential stepping relay (not shown) in the test unit 14 whereby the high-potential side of the high voltage is connected to the next selected conductor 12. This procedure is continued to sequentially test successive conductors 12–12 for breakdowns, shorts and continuity.

The system 11 could be utilized for testing the individual conductors 12–12 for continuity only wherein the high-voltage breakdown detection facilities of the breakdown test unit 14 are not required. However, the sequential facilities and the high-voltage source of the test unit 14 are used to connect sequentially the high-potential side of the high-voltage source to successive conductors. The pickup device 16, the electrostatic detector 17 and the indicator 18 are used in the manner previously described to provide indication of the results of the continuity test of each of the conductors 12–12.

I claim:

1. A method of testing at least two adjacent conductors for defective insulation and continuity, which comprises the steps of:
    applying a voltage difference of at least a predetermined magnitude between the two conductors,
    testing for electrical characteristics resulting from the application of the voltage difference to the conductors which are indicative of defective insulation, and
    detecting for the presence of an electrostatic field adjacent to an end of at least one of the conductors resulting from the application of the voltage difference to the conductors to provide an indication if a particular one of the conductors is continuous, the absence of an electrostatic field indicating an open circuit in the particular conductor.

2. The method as set forth in claim 1 wherein the testing for electrical characteristics and the detecting for the presence of the electrostatic field are conducted simultaneously.

3. A method of performing simultaneously automatic breakdown and continuity testing of conductors of a cable, which comprises the steps of:
    connecting a high-potential side of a high voltage to a first portion of a particular one of a plurality of conductors of a cable,
    connecting the low-potential side of the high voltage to a portion of each of the remaining plurality of the conductors of the cable,
    testing the conductors for current flow in the plurality of conductors as an indication of a breakdown between the particular conductor and at least one of the remaining conductors, and
    testing simultaneously for the presence of an electrostatic field at a second portion of the particular conductor spaced from the first portion thereof as an indication of continuity between the first and second portions of the particular conductor.

4. The method set forth in claim 3 including the step of connecting the high-potential side of the high voltage sequentially to each of the plurality of the conductors of the cable with the remaining plurality of conductors of the cable being connected to the low-potential side of the high voltage so that each of the plurality of conductors can be tested for breakdowns and continuity.

5. A method of testing at least two conductors for breakdown and continuity, which comprises the steps of:
    connecting a voltage source between at least two conductors,
    positioning an electrostatic detector adjacent to an end of a particular one of the conductors,
    testing the conductors for the flow of current in the conductors as an indication of breakdown between the conductors,
    testing the particular one of the conductors for continuity by operating the electrostatic detector to determine the presence of an electrostatic field at the end of the particular conductor as an indication of continuity of the conductor, and
    operating the high-voltage source and the electrostatic detector simultaneously so that the testing for breakdown and continuity is conducted simultaneously.

6. A system for testing at least two adjacent conductors for defective insulation and continuity, which comprises:
    means for applying a voltage difference of at least a predetermined magnitude between the two conductors,
    means for testing for electrical characteristics resulting from the application of the voltage difference to the conductors which are indicative of defective insulation, and
    electrostatic field detecting means for detecting for the presence of an electrostatic field adjacent to an end of at least one of the conductors resulting from the application of the voltage difference to the conductors to provide an indication if a particular one of the conductors is continuous, the absence of an electrostatic field indicating an open circuit in the particular conductor.

7. The system as set forth in claim 6 including means for controlling the testing for electrical characteristics and the detecting for the presence of the electrostatic field to conduct the testing and detecting simultaneously.

8. A system for performing simultaneously automatic breakdown and continuity testing of conductors of a cable, which comprises:
    means for connecting a high-potential side of a high voltage to a first portion of a particular one of a plurality of conductors of a cable,
    means for connecting the low-potential side of the high voltage to a portion of each of the remaining plurality of the conductors of the cable, means for testing the conductors for current flow in the plurality of conductors as an indication of a breakdown between the particular conductor and at least one of the remaining conductors, and electrostatic field detecting means for testing simultaneously for the presence of an electrostatic field at a second portion of the particular conductor spaced from the first portion thereof as an indication of continuity between the first and second portions of the particular conductor.

9. The system set forth in claim 8 including means for connecting the high-potential side of the high voltage sequentially to each of the plurality of the conductors of the cable and the remaining plurality of conductors of the cable to the low-potential side of the high voltage so that each of the plurality of conductors can be tested for breakdowns and continuity.

10. A system for testing at least two conductors for breakdown and continuity, which comprises:

means for connecting a voltage source between at least two conductors, an electrostatic detector positioned adjacent to an end of a particular one of the conductors, means for testing the conductors for the flow of current in the conductors as an indication of breakdown between the conductors, means for testing the particular one of the conductors for continuity by operating the electrostatic detector to determine the presence of an electrostatic field at the end of the particular conductor as an indication of continuity of the conductor, and means for operating the high-voltage source and the electrostatic detector simultaneously so that the testing for breakdown and continuity is conducted simultaneously.